(12) United States Patent
Hart et al.

(10) Patent No.: US 12,314,773 B2
(45) Date of Patent: May 27, 2025

(54) DYNAMIC SELECTION OF WHERE TO EXECUTE APPLICATION CODE IN A DISTRIBUTED CLOUD COMPUTING NETWORK

(71) Applicant: CLOUDFLARE, INC., San Francisco, CA (US)

(72) Inventors: Michael Hart, New York, NY (US); Alyson Cabral, Austin, TX (US); Kenton Taylor Varda, Austin, TX (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 18/362,721

(22) Filed: Jul. 31, 2023

(65) Prior Publication Data

US 2024/0264877 A1    Aug. 8, 2024

Related U.S. Application Data

(63) Continuation of application No. 18/166,400, filed on Feb. 8, 2023, now Pat. No. 11,755,381.

(51) Int. Cl.
G06F 9/50        (2006.01)

(52) U.S. Cl.
CPC ............ G06F 9/5072 (2013.01); *G06F 9/505* (2013.01)

(58) Field of Classification Search
CPC .................................................. G06F 9/5072
See application file for complete search history.

(56) References Cited

U.S. PATENT DOCUMENTS

| | | |
|---|---|---|
| 11,755,381 B1 | 9/2023 | Hart et al. |
| 2011/0238722 A1* | 9/2011 | Presley .................. G06F 9/548 |
| | | 709/201 |
| 2013/0103646 A1 | 4/2013 | Nagpal et al. |
| 2020/0287817 A1 | 9/2020 | Howard et al. |
| 2021/0144206 A1 | 5/2021 | Gupta et al. |
| 2021/0185111 A1 | 6/2021 | Yao |
| 2022/0206763 A1 | 6/2022 | Kawakami et al. |

OTHER PUBLICATIONS

International Search Report and Written Opinion, PCT App. No. PCT/US2023/085572, Apr. 25, 2024, 09 pages.
Notice of Allowance, U.S. Appl. No. 18/166,400, Apr. 24, 2023, 9 pages.

* cited by examiner

*Primary Examiner* — Charlie Sun
(74) *Attorney, Agent, or Firm* — NICHOLSON DE VOS WEBSTER & ELLIOTT LLP

(57) ABSTRACT

A request is received from a client device at a first datacenter a distributed cloud computing network. The distributed cloud computing network includes multiple datacenters. The received request triggers execution of code at the distributed cloud computing network. The code includes a first function and a second function. A determination is made to execute the first function at the first datacenter and to execute the second function at a second datacenter of the distributed cloud computing network. The first function is executed at the first datacenter to get a first result. The first datacenter causes the second function to be executed at the second datacenter. The first datacenter receives, from the second datacenter, a second result from the execution of the second function. The first datacenter transmits a response to the client device that is based at least in part on the first result and the second result.

21 Claims, 7 Drawing Sheets

| LATENCY METRICS 510 | | |
|---|---|---|
| FROM | DEST | LATENCY |
| 110 | 120A | 10 |
| 110 | 120B | 15 |
| 110 | 120C | 30 |
| 120A | 130 | 50 |
| 120A | 135 | 20 |
| 120B | 130 | 40 |
| 120B | 135 | 25 |
| 120C | 130 | 30 |
| 120C | 135 | 50 |

| APP CALLS 515 | |
|---|---|
| DEST | NUM OF CALLS |
| 130 | 5 |
| 135 | 2 |

| TOTAL LATENCY 520 | |
|---|---|
| DATACENTER | TOTAL LATENCY |
| 120A | 300 |
| 120B | 265 |
| 120C | 280 |

FIG. 5

DYNAMIC SELECTION OF WHERE TO EXECUTE APPLICATION CODE IN A DISTRIBUTED CLOUD COMPUTING NETWORK

CROSS-REFERENCE TO RELATED APPLICATIONS

This application is a continuation of application Ser. No. 18/166,400, filed Feb. 8, 2023, which is hereby incorporated by reference.

FIELD

Embodiments of the invention relate to the field of cloud computing; and more specifically, to dynamic selection of where to execute application code in a distributed cloud computing network.

BACKGROUND

Cloud based networks may include multiple servers that are geographically distributed. The servers may be part of a content delivery network (CDN) that caches or stores content at the servers to deliver content to requesting clients with less latency due at least in part to the decreased distance between requesting clients and the content.

Serverless computing is a method of providing backend services on an as-used basis. A serverless provider allows users to write and deploy code without the hassle of worrying about the underlying infrastructure. Despite the name serverless, physical servers are still used but developers do not need to be aware of them. Many serverless computing environments offer database and storage services and some allow for code to be executed on the edge of the network and therefore close to the clients.

In modern application development, complex applications can include multiple databases and services including third-party services/databases and/or internal services/databases.

SUMMARY

A request is received from a client device at a first datacenter of a distributed cloud computing network. The distributed cloud computing network includes multiple datacenters. The request triggers execution of code at the distributed cloud computing network. The code may be third-party code that is written or deployed by a customer of the distributed cloud computing network. The code includes a first function and a second function. A determination is made to execute the first function at a first datacenter of the distributed cloud computing network and to execute the second function at a second datacenter of the distributed cloud computing network. The first function is executed at the first datacenter to get a first result. The first datacenter causes the code is second function to be executed at the second datacenter. The first datacenter receives a second result from the second function being executed at the second datacenter. The first datacenter transmits a response to the client device that is based at least in part on the first result and the second result.

BRIEF DESCRIPTION OF THE DRAWINGS

The invention may best be understood by referring to the following description and accompanying drawings that are used to illustrate embodiments of the invention. In the drawings:

FIG. 5 shows exemplary data for dynamically selecting where to run application code in a distributed cloud computing network according to an embodiment.

DESCRIPTION OF EMBODIMENTS

Dynamically selecting where to execute code in a distributed cloud computing network is described. Code is triggered to execute at a distributed cloud computing network that includes multiple datacenters. The code may be triggered responsive to a trigger event. Example trigger events include: receiving a request from a client device at a first datacenter of multiple datacenters of the distributed cloud computing network, where that request triggers execution of code; a predefined scheduled time; an alarm condition met; an external event such as receipt of an email, text message, or other electronic communication; and a message being sent to a queue system. The code, when executed, can call server(s) external to the distributed cloud computing network. As an example, a third-party database, a third-party database service (e.g., authorization service, authentication service, an API service), and/or a third-party private service may be called by the executing code. Based at least partially on an optimization goal, a dynamic selection of where to execute the code in the distributed cloud computing network is made (e.g., at which datacenter in the distributed cloud computing network). The optimization goal may be based on metric(s) and/or attribute(s) such as latency, expense, throughput, reliability, bandwidth, compute resource availability, and/or processing capability. The datacenter that is selected executes the code. The result of the execution of the code may be returned to the first datacenter for response.

The code may be third-party code written or deployed by a customer of the distributed cloud computing network. The code may be first-party code written or deployed by the provider of the distributed cloud computing network. The code may be part of a serverless application that includes multiple functions. The code can be, for example, a piece of JavaScript or other interpreted language, a WebAssembly (WASM) compiled piece of code, or other compiled code. This code is typically executed in a runtime at a compute server of the distributed cloud computing network and is not part of a webpage or other asset of a third-party. The code may be executed at any of the multiple datacenters of the distributed cloud computing network.

In an example where the triggering event is based on receipt of a request, the first datacenter that receives the initial request may terminate a TLS connection, respond to DNS queries, apply any security/access policies, apply frontend user facing work such as template rendering, and/or perform other services that do not rely on external destinations. The first datacenter may be the closest datacenter of the distributed cloud computing network to the requesting client device. This means that services that do not rely on external destinations may be performed close to the client and service(s) that rely on external destinations may be performed elsewhere in the network (e.g., closer to the external destination).

Figure 1:
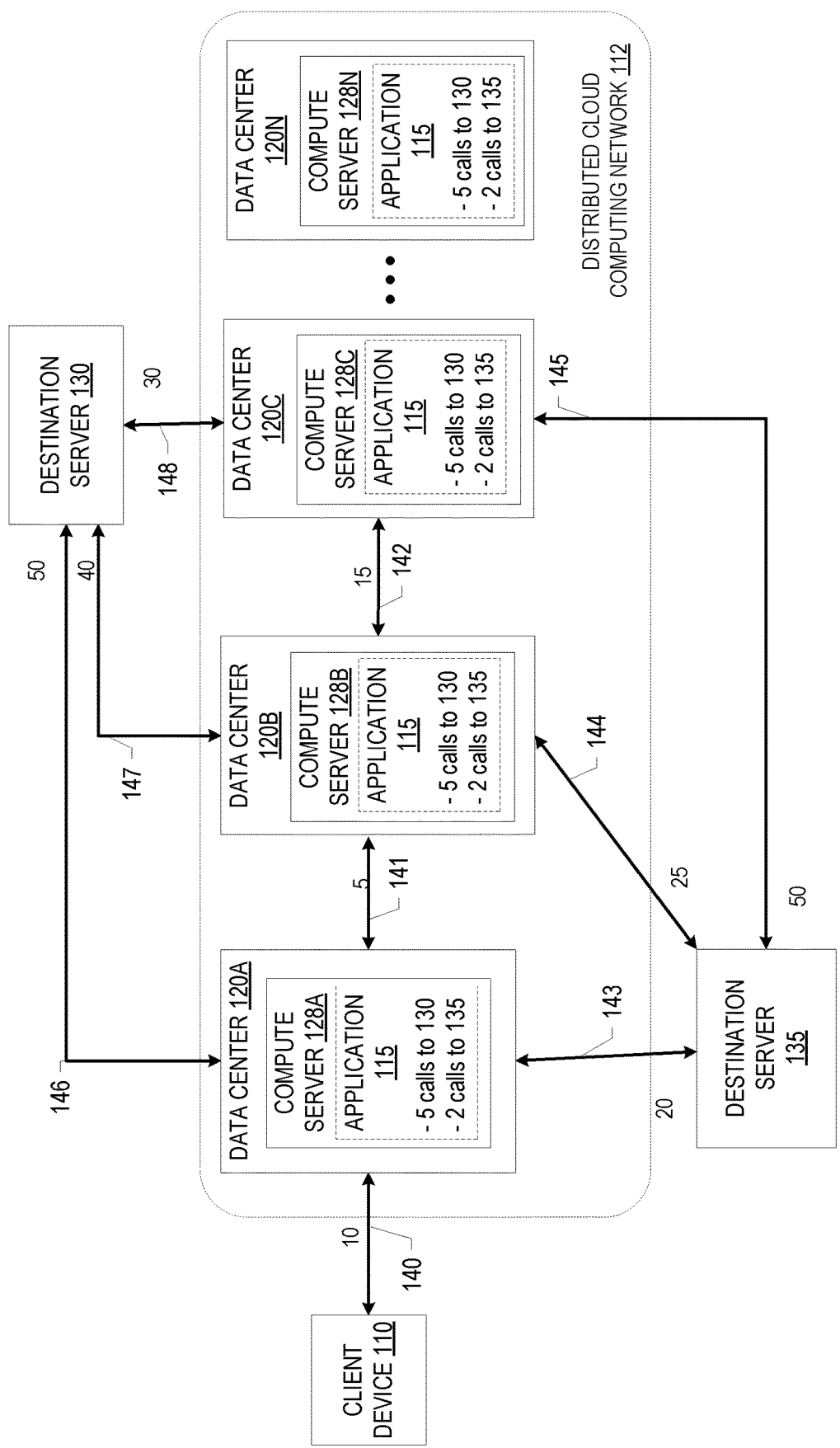
FIG. 1 illustrates an exemplary system for dynamically selecting where to run code in a distributed cloud computing network according to an embodiment.

FIG. 1 illustrates an exemplary system for dynamically selecting where to run code in a distributed cloud computing network according to an embodiment. The distributed cloud computing network 112 includes the datacenters 120A-N. The datacenters 120A-N may include hundreds to thousands of datacenters that are geographically distributed. The datacenters 120A-N include one or more compute server(s) 128A-N respectively and may also include one or more control servers, one or more DNS servers, and/or one or more other pieces of network equipment such as router(s), switch(es), and/or hub(s). In an embodiment, each compute server within a datacenter may process network traffic (e.g., TCP, UDP, HTTP/S, SPDY, FTP, TCP, UDP, IPSec, SIP, or other IP protocol traffic). The datacenters 120A-N may be connected across the internet. The distributed cloud computing network 112 may provide services including performing one or more of performance services and/or one or more security services. The one or more performance services can include a content delivery network, caching, video delivery, website optimizations (e.g., asynchronous loading, image optimizations, mobile optimizations), load balancing, intelligent routing, availability, and/or protocol management (e.g., IPv4/v6 gateway). The one or more security services can include DDOS protection, secure session (SSL/TLS) support, web application firewall, threat blocking, privacy protection, access control, compliance, zero-trust, data loss prevention, and/or rate limiting. The performance services and security services described above are examples and the distributed cloud computing network 112 may perform different services than described. In an embodiment, each performance service and/or security service can be performed in each datacenter 120.

Network traffic is received at the distributed cloud computing network 112 from client devices such as the client device 110. The client device 110 is a computing device (e.g., laptop, workstation, smartphone, mobile phone, tablet, gaming system, set top box, wearable device, Internet of Things (IoT) device, etc.) that can transmit and/or receive network traffic. Each client device may execute a client network application such as a web browser, native application, or other application that can access network resources (e.g., web pages, images, word processing documents, PDF files, movie files, music files, or other computer files).

The network traffic may be destined to a customer of the distributed cloud computing network 112. The traffic may be received at the distributed cloud computing network 112 in different ways. For instance, IP address(es) of an origin network belonging to the customer may be advertised (e.g., using Border Gateway Protocol (BGP)) by the distributed cloud computing network 112 instead of being advertised by the origin network. As another example, the datacenters of the distributed cloud computing network 112 may advertise a different set of anycast IP address(es) on behalf of the origin and map those anycast IP address(es) to the origin IP address(es). This causes IP traffic to be received at the distributed cloud computing network 112 instead of being received at the origin network. As another example, network traffic for a hostname of the origin network may be received at the distributed cloud computing network 112 due to a DNS request for the hostname resolving to an IP address of the distributed cloud computing network 112 instead of resolving to an IP address of the origin network. As another example, client devices may be configured to transmit traffic to the distributed cloud computing network. For example, an agent on the client device (e.g., a VPN client) may be configured to transmit traffic to the distributed cloud computing network 112. As another example, a browser extension or file can cause the traffic to be transmitted to the distributed cloud computing network 112.

In any of the above embodiments, the network traffic from the client device 110 may be received at a particular datacenter 120 that is determined to be closest to the client device 110 in terms of routing protocol configuration (e.g., Border Gateway Protocol (BGP) configuration) according to an anycast implementation as determined by the network infrastructure (e.g., router(s), switch(es), and/or other network equipment between the client device 110 and the datacenters 120A-N) or by a geographical load balancer. As illustrated in FIG. 1, the client device 110 is closest to the datacenter 120A. Accordingly, requests from the client device 110 are received at the datacenter 120A.

Figure 3:
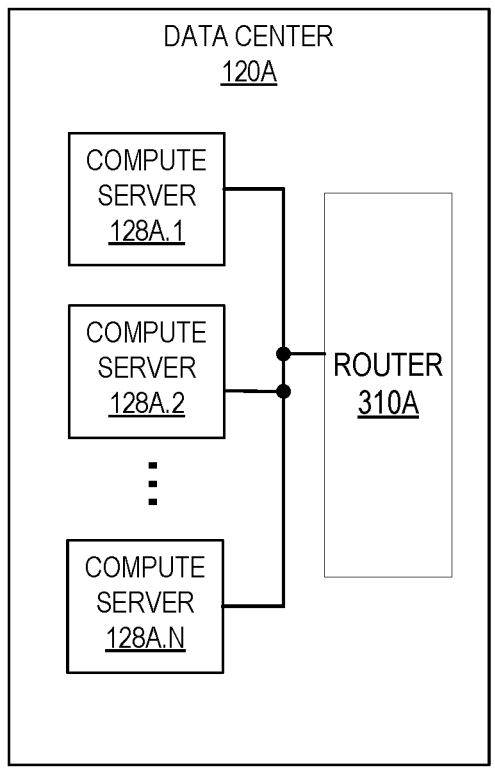
FIG. 3 illustrates an example architecture of a datacenter according to an embodiment.

FIG. 3 illustrates an example architecture of a datacenter 120 according to an embodiment. The datacenter 120A includes the compute servers 128A.1-128A.N that are each connected to the router 310A. Each of the compute servers 128A.1-128A.N may be separate physical devices or may be virtual instances running on one or more separate physical devices. Each different compute server 128A.1-128A.N may be assigned a different IP address. The router 310A receives network traffic and determines one of the compute servers 128A.1-128A.N to which it will transmit the network traffic for processing. In an embodiment, the compute servers 128A.1-128A.N form an ECMP group and the router 310A divides the traffic between the compute servers 128A.1-128A.N. In another embodiment, a layer 4 load balancing is used to distribute traffic among the compute servers 128A.1-128A.N.

Since the datacenters 120A-N are geographically distributed, the distance between requesting client devices and the compute servers is decreased. This decreases the time to respond to a request. A compute server 128 within a datacenter 120 that receives the initial request may terminate the TLS connection with the requesting computing device.

The received network traffic can trigger the execution of code at a compute server 128. The code can also be triggered by other trigger events such as a predefined scheduled time, an alarm condition being met, an external event such as a receipt of an email, text message, or other electronic communication, and a message being sent to a queue system. These trigger events are examples and there may be other events or data that trigger the execution of code at the compute server 128. The code may be third-party code written or deployed by a customer of the distributed cloud computing network and/or first-party code written or deployed by the provider of the distributed cloud computing network. The code may include one or more functions. The code may be part of a serverless application. The code can be, for example, a piece of JavaScript or other interpreted language, a WebAssembly (WASM) compiled piece of code, or other compiled code. In an embodiment, the code is compliant with the W3C standard ServiceWorker API. The code is typically executed in a runtime at a compute server and is not part of a webpage or other asset of a third-party. In an embodiment, the code can be executed at any of the datacenters 120A-N. The code is sometimes referred herein as application code or simply an application. As shown in FIG. 1, the application 115 can be executed at any of the datacenters 120A-N.

In an embodiment, each application is run in an isolate of the V8 JavaScript engine. Each application can run within a single process. This single process can include multiple execution environments at the same time and the process can seamlessly switch between them. Code in one execution environment cannot interfere with code running in a different execution environment despite being in the same process. The execution environments are managed in user-space rather than by an operating system. Each execution environment uses its own mechanism to ensure safe memory access, such as preventing the code from requesting access to arbitrary memory (restricting its use to the objects it has been given) and/or interpreting pointers within a private address space that is a subset of an overall address space. In an embodiment, the code is not executed using a virtual machine or a container. However, in other embodiments, the code is executed using a virtual machine or a container.

Although not illustrated in FIG. 1, the distributed cloud computing network may include a control server that provides a set of tools and interfaces for a customer to, among other things, configure code to run in the distributed cloud computing network including configuring triggering event(s), configure processing task(s) predictions for the code, configure optimization goals, and/or otherwise configure the dynamic selection of where to execute the code in the distributed cloud computing network. The control server may deploy the applications to each of the datacenters and/or compute servers.

In the example of FIG. 1, each datacenter 120 includes at least one compute server that can execute the application. The application 115 may be triggered for execution upon receiving a request for a domain and may be loaded and executed on-demand (when and only if it is needed) at a compute server. The application 115 can also be triggered by other trigger events such as a predefined scheduled time, an alarm condition being met, an external event such as a receipt of an email, text message, or other electronic communication, and a message being sent to a queue system. These trigger events are examples and there may be other events or data that trigger the execution of code at the compute server 128.

The application executing on the distributed cloud computing network can depend on other data and/or services. For instance, the application can be configured to: access an internal database or other data store provided by the distributed cloud computing network 112, access an external database or other data store provided by a third-party (which may be the same or different from the third-party that wrote and/or deployed the application), access a backend service provided by a third-party (e.g., an application programming interface (API) server provided by a third-party, an authentication/authorization server provided by a third-party), and/or access any other service or application. For purposes of description, each of these requests or accesses is sometimes referred herein as an application call.

As an example, the application executing on the distributed cloud computing network may make several application calls to a remote database (which may be a third-party database). These application calls traverse the internet to reach the destination server to be processed and the result is returned to the application. If the application calls are done serially, the time to return a result depends in part on the distance between where the application calls were made and where they are received. For instance, if the application is executing on a compute server of the distributed cloud computing network located in California and the destination database is in London, the minimum amount of time for receiving a result from the destination database is (1) the amount of time for the application call to be sent from the compute server in California and received at the server in London, (2) the amount of time for the server in London to process the request, and (3) the amount of time for the reply to be sent from the server in London to the server in California. The total time is approximately multiplied by the number of application calls that are made.

As illustrated in FIG. 1, the application 115 includes five application calls to the destination server 130 and two application calls to the destination server 135. These application calls occur serially. In this example, the destination server 130 and the destination server 135 are each external to the distributed cloud computing network 112.

The compute server that receives the data that triggers the code (e.g., the compute server 128A) dynamically selects where to execute the code in the distributed cloud computing network (e.g., select the particular datacenter 120 in the distributed cloud computing network to execute the code). For instance, based on an optimization goal and a set of one or more properties, the compute server selects the datacenter that is optimal to execute the code. An optimization goal can be based on factors such as latency, expense, throughput, reliability, bandwidth, application processing readiness, compute resource availability, and/or processing capability. The optimization goal may be defined by the customer and/or be defined by the provider of the distributed cloud computing network 112. The set of one or more properties may include one or more metrics and/or one or more attributes. The set of properties can be stored in a data structure that is accessible to the compute server. A datacenter that is selected for executing the code is sometimes referred herein as a selected datacenter.

Latency refers to the time to process the code and return a result. Latency can include network latency. An optimization goal to minimize latency may lead to a selection of the datacenter(s) that lead to the lowest total latency.

Expense refers to the cost of processing (e.g., cost of CPU/hr, cost of using certain network links). The expense can differ based on the time of day (e.g., electricity cost may be lower at night versus the day). An optimization goal to minimize cost may lead to a selection of the datacenter(s) and/or network links that are the least expensive.

Throughput refers to the amount of data being processed. An optimization goal to maximize throughput may lead to the code being distributed in the distributed cloud computing network such that the total throughput is maximized (e.g., move work from an overutilized datacenter to an underutilized datacenter).

Reliability refers to the reliability of network links and/or datacenters. For instance, some network links may be more reliable than others. An optimization goal to maximize reliability may lead to a selection of the datacenter(s) and/or network link(s) that are the most reliable.

Bandwidth refers to the bandwidth of the network links. An optimization goal based on bandwidth may lead to a selection of the datacenter(s) and/or network link(s) that have the largest bandwidth.

Application processing readiness refers to the readiness of processing the application. For instance, in some cases, the application is run in an isolate of a JavaScript engine and application processing readiness refers to whether an isolate for the application is already running in a datacenter. If an isolate for the application is not already running, then an isolate will need to be instantiated and that adds latency. Thus, an already running isolate reduces the total time for processing as compared to an isolate that needs to be started. The property of the application processing readiness may be used in other optimization goals such as an optimization goal to minimize latency.

Compute resource availability refers to the availability of compute resources at a datacenter and/or compute server, such as available CPU cycles, available GPU cycles, available memory, available disk space, etc.

Processing capability refers to the processing capability at a datacenter and/or compute server. Different datacenters and/or compute servers can have different processing capabilities including different hardware capabilities (e.g., different numbers and/or types of CPU(s), GPU(s), hardware accelerator(s), storage device type/size, memory type/size) and/or software capabilities. A processing task may be best suited for a particular processing capability. For instance, if a processing task of the application is to process video, some datacenters and/or compute servers may process video more efficiently compared to other datacenters and/or compute servers (e.g., include GPU(s) versus only processing at CPU(s)). As another example, if a processing task of the application is memory intensive (e.g., processing large amounts of data in memory), some datacenters and/or compute servers may have larger and/or faster memory that deliver faster performance compared to other datacenters and/or compute servers.

In an embodiment, different parts of the application can be selected to execute in different locations of the distributed cloud computing network 112. As an example, a first part of the code (e.g., a first function) can be selected to execute in a first datacenter and a second part of the code (e.g., a second function) can be selected to execute in a second datacenter. In this example, the first datacenter may be closest to the requesting client device and the second datacenter may be closest to a database accessed by the second function. These different parts of the application may have different optimization goals or the same optimization goals.

Figure 2:
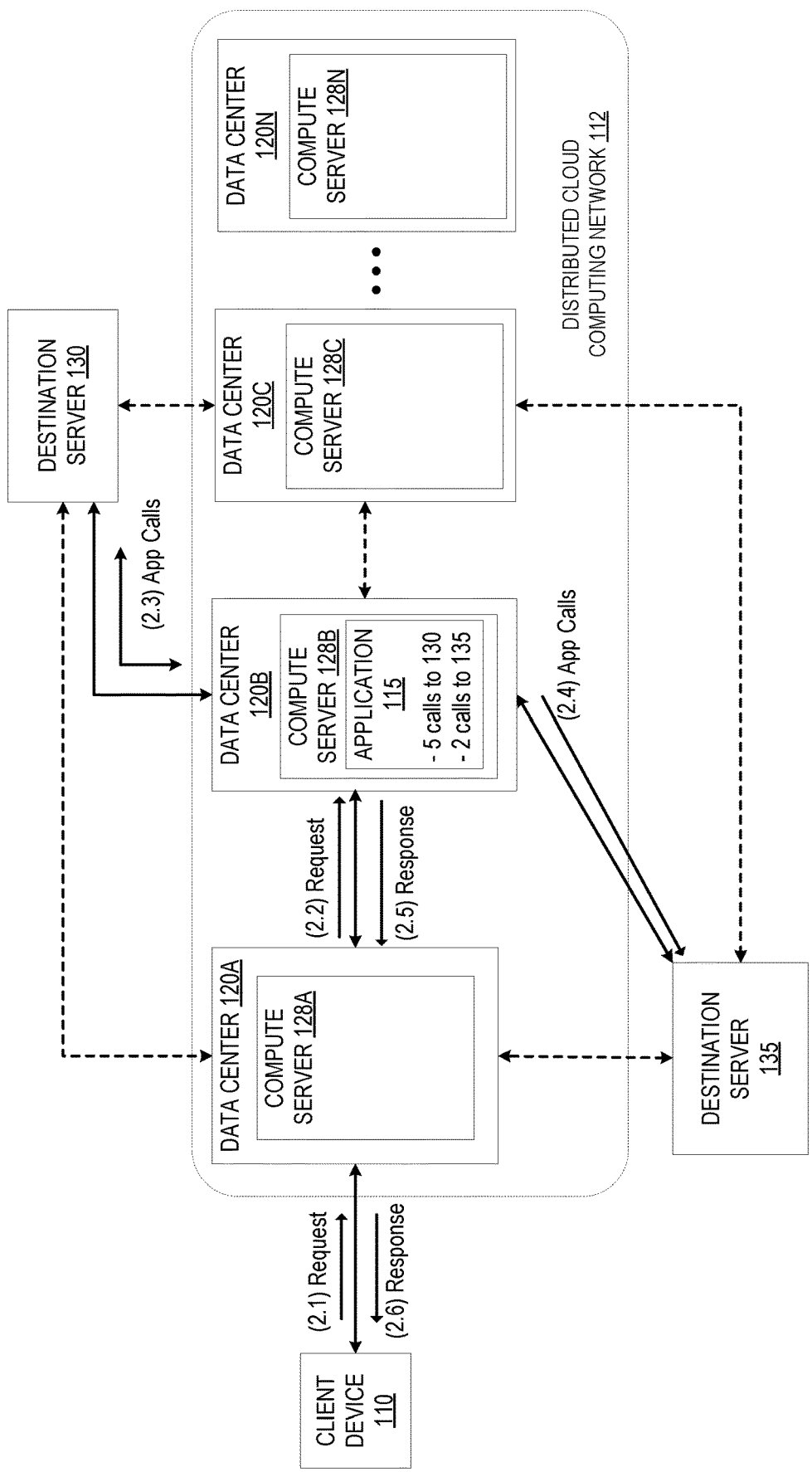
FIG. 2 illustrates an exemplary system for dynamically selecting where to run code in a distributed cloud computing network according to an embodiment.

An example optimization goal for minimizing latency when delivering a response to the client device 110 is shown in FIGS. 1 and 2. In the example of FIGS. 1 and 2, the compute server 128A of the datacenter 120A receives a request from the client device 110 at operation 2.1 and determines that the request triggers the execution of the application 115. The request can be an HTTP or HTTPS request and destined for a zone. The datacenter 120A may be the closest datacenter of the datacenters 120A-N to the client device 110 in terms of routing protocol configuration or by a geographical load balancer. The compute server 128A may determine that the request triggers execution of the application 115 by matching the zone to a predetermined matching pattern that associates the application 115 to the predetermined matching pattern. For instance, the compute server 128A may analyze the request URL against a URL matching pattern configured for the zone to determine if an application is to be executed and if so, which application.

Based on the optimization goal for minimizing latency when delivering a response to the client device 110, the compute server 128A dynamically selects where to execute the application 115 in the distributed cloud computing network 112 (e.g., select the particular datacenter 120 in the distributed cloud computing network to execute the application). As described above, the application 115 will make five serial application calls to the destination server 130 and two serial application calls to the destination server 135. This is represented in the application calls table 515.

The compute server 128 determines, for each datacenter, the total expected latency if that datacenter executed the application 115. Example latencies are shown in FIG. 1. The latency between the client device 110 and the datacenter 120A over the communication link 140 is 10. The latency between the datacenter 120A and the datacenter 120B over the communication link 141 is 5. The latency between the datacenter 120B and the datacenter 120C over the communication link 142 is 15. The latency between the datacenter 120A and the destination server 130 over the communication link 146 is 50. The latency between the datacenter 120A and the destination server 135 over the communication link 143 is 20. The latency between the datacenter 120B and the destination server 130 over the communication link 147 is 40. The latency between the datacenter 120B and the destination server 135 over the communication link 144 is 25. The latency between the datacenter 120C and the destination server 130 over the communication link 148 is 30. The latency between the datacenter 120C and the destination server 135 over the communication link 145 is 50. These communications links may not be direct communication links and instead may traverse one or more links. The latency metrics are stored in a data structure that is accessible to the compute server and represented by the latency metrics table 510 of FIG. 5. For each datacenter, the compute server 128 calculates the weighted latency values for the application calls and adds the metric value from the current datacenter to that datacenter. The weight is defined as the number of serial application calls that are to be performed. For instance, the determined latency from each datacenter to the destination server 130 is multiplied by five and the determined latency from each datacenter to the destination server 135 is multiplied by two. The compute server 128A also adds the latency metric from the current datacenter 120A to the remote datacenters. The total expected latency is shown in the total latency table 520. As an example, the total expected latency if the datacenter 120A executes the application 115 is 300, the total expected latency if the datacenter 120B executes the application 115 is 265, and the total expected latency if the datacenter 120C executes the application 115 is 280. In this example, the compute server 128A selects the datacenter for processing that has the lowest total expected latency (e.g., the datacenter 120B).

The compute server 128A causes the application 115 to be processed at the selected datacenter, e.g., the datacenter 120B. The compute server 128A may forward the request to the datacenter 120B at operation 2.2. This request may be like the request in operation 2.1. A compute server at the selected datacenter processes the request that triggers the execution of the application 115 and executes the application 115 including making the application calls. For instance, the compute server 128B makes the application calls to the destination server 130 (e.g., 5 application calls) at operation 2.3, and makes the application calls to the destination server 135 (e.g., 2 application calls) at operation 2.4. The compute server 128B generates and transmits the response to the compute server 128A at operation 2.5 which in turn transmits the response to the client device 110 at operation 2.6.

Although FIGS. 1 and 2 show an example optimization goal based on latency, other optimization goals may be used based on factors including expense, throughput, reliability, bandwidth, compute resource availability, and/or processing capability.

Although FIGS. 1 and 2 show an application being executed in a single datacenter, in other embodiments different parts of the application can be selected to execute in different parts of the distributed cloud computing network 112. As an example to minimize latency, the compute server 128 may select the datacenter 120C to execute the part of the application 115 that makes five serial application calls to the destination server 130 (the datacenter 120C has the lowest total expected latency out of the datacenters 120A-N for making five serial application calls to the destination server 130) and select itself to make the two application calls to the destination server 135 (the datacenter 120A has the lowest total expected latency out of the datacenters 120A-N for making two serial application calls to the destination server 135).

Although FIGS. 1 and 2 show the application 115 being triggered for execution based upon receipt of a request, the application can be triggered by other trigger events such as a predefined scheduled time, an alarm condition being met, an external event such as a receipt of an email, text message, or other electronic communication, and a message being sent to a queue system. In such a case, the initial datacenter may cause or otherwise instruct the selected datacenter to execute the application 115 including any information that is required for processing the application 115. For instance, the initial datacenter 120A may communicate an identifier of the application 115 to the selected datacenter 128B along with any other information necessary for the application 115 to process.

Figure 4:
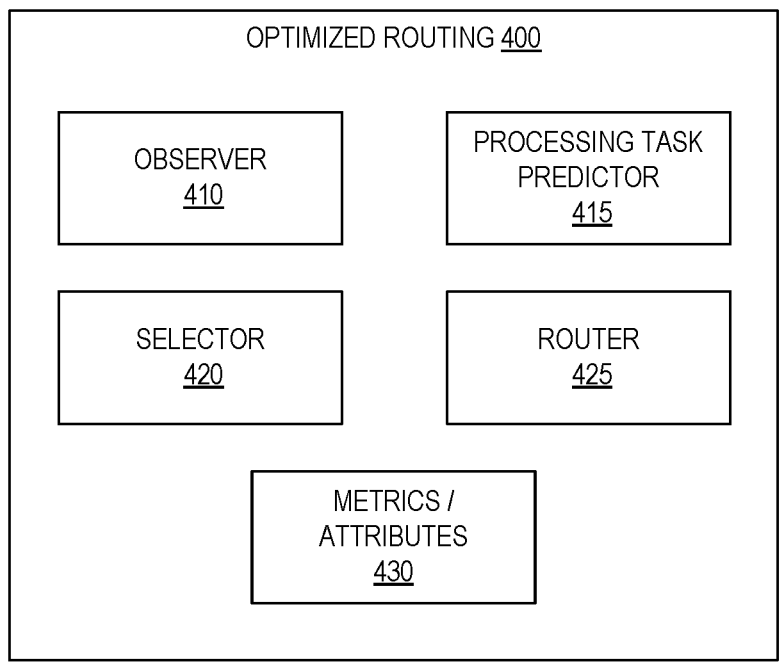
FIG. 4 shows exemplary server components for dynamically selecting where to run application code in a distributed cloud computing network according to an embodiment.

FIG. 4 shows exemplary server components for dynamically selecting where to run application code in a distributed cloud computing network according to an embodiment. In an embodiment, each compute server includes the components shown in FIG. 4.

The observer 410 can be used for recording information about application calls made by an application (e.g., the destination hostnames and number). This information can be used by the processing task predictor 415 to predict the processing task(s) that the application will perform. This information may be transmitted to a central server for aggregation with other information from other compute servers.

At the time of receiving network data that triggers the execution of an application, the processing tasks that will be performed by the application may be unknown. For instance, the number and destination of the calls may not be known at the time of receiving the triggering network data. The processing task predictor 415 predicts the processing task(s) that the application will perform. Predicting the processing tasks may be based on past behavior of requests that triggered the application, based on configuration from the application developer, and/or based on application code configurations. The predicted processing tasks may include one or more application calls to databases and/or services such as a database internal to the distributed cloud computing network, a third-party database, a third-party database service (e.g., authorization, authentication, API), and/or a third-party private service (e.g., VPC). Predicting the processing tasks may include determining which of the application calls must be performed serially and/or which can be performed in parallel. Predicting the processing tasks may include determining whether an application call is to read data (e.g., read from a database) or write data (e.g., write to a database). If the application call is to read data, that data may be in a read replica database that is part of the distributed cloud computing network. Predicting the processing tasks may include determining whether the application call is to retrieve data that is cached (or likely cached) at the distributed cloud computing network or otherwise available to the distributed cloud computing network.

As an example for predicting tasks based on past behavior, a machine learning model can be used to predict the number and destination of application calls that the application will perform. The machine learning model may take as input one or more properties of the initiating request such as the HTTP method, HTTP header(s), URL path, URL query parameters, and/or the HTTP body. Any or all of these can be signals that a different set of application calls can be made. The output of the machine learning model may be the number of non-overlapping application calls (serial application calls) made to each destination. There may be a separate ML model trained for each unique application. In an embodiment, the same ML model for the application may be used at each of the compute servers of the distributed cloud computing network. That is, the same ML model is used network wide. In another embodiment, different ML models for the application can be used at a different granularity (e.g., per-datacenter, per-region level).

The processing task predictor 415 may use configuration from the application developer to predict the processing task(s). The configuration may specify, for instance, a list of hostnames and/or IP addresses for application calls the application will perform. The configuration may also include a weighting (how many application calls) to each unique hostname and/or IP address. The configuration may also indicate whether a hostname is expected to be multihomed. The configuration may be input to a central location of the distributed cloud computing network and stored in a data structure available to the compute server (e.g., locally stored at each compute server or at each datacenter).

The processing task predictor 415 may use application code configurations when predicting tasks. For example, the processing task predictor 415 may analyze the application or the configuration of the application to determine the relationship of the application with other services and resources such as whether the application is associated with a particular database, a particular API, and/or a particular TCP/socket.

The processing task predictor 415 may determine which of the predicted application call(s) must be preformed serially and/or which can be performed in parallel. Determining which of the predicted application call(s) must be performed serially may be done by historical analysis of timestamps of the application calls that are performed by the application. A sequence of application calls with non-overlapping timestamps are treated as being serial and application calls with overlapping timestamps are treated as being parallel.

The selector 420 dynamically selects where in the distributed cloud computing network 112 to execute the application code. This selection is based on an optimization goal as described herein. The optimization goal may be defined by the customer and/or be defined by the provider of the distributed cloud computing network 112. The selection uses a set of one or properties including the one more metrics and/or attributes 430. For an application call that is to read data (e.g., read data from a database), the selector 420 may determine whether a read replica database for that read call is available (or likely available) and if so may determine to make that read call close to the read replica database (which may be in the initial datacenter) instead of making the read call to the primary database if that meets the optimization goal. For an application call that is to read data that is cached, or likely cached, at the distributed cloud computing network that is otherwise available to the distributed cloud computing network, the selector 420 may determine to make that call close to the cache (which may be in the initial data center) instead of making the call close to the source data if that meets the optimization goal.

The router 425 causes the application code to be executed at the selected datacenter. As an example, the router 425 transmits the initial request to the selected datacenter for execution. As another example, if the application code is triggered by an event different from an initial request (e.g., a predefined scheduled time, an alarm condition being met, an external event such as a particular electronic communication being received), the router 425 may send a communication to the selected datacenter to invoke the application code.

Figure 6:
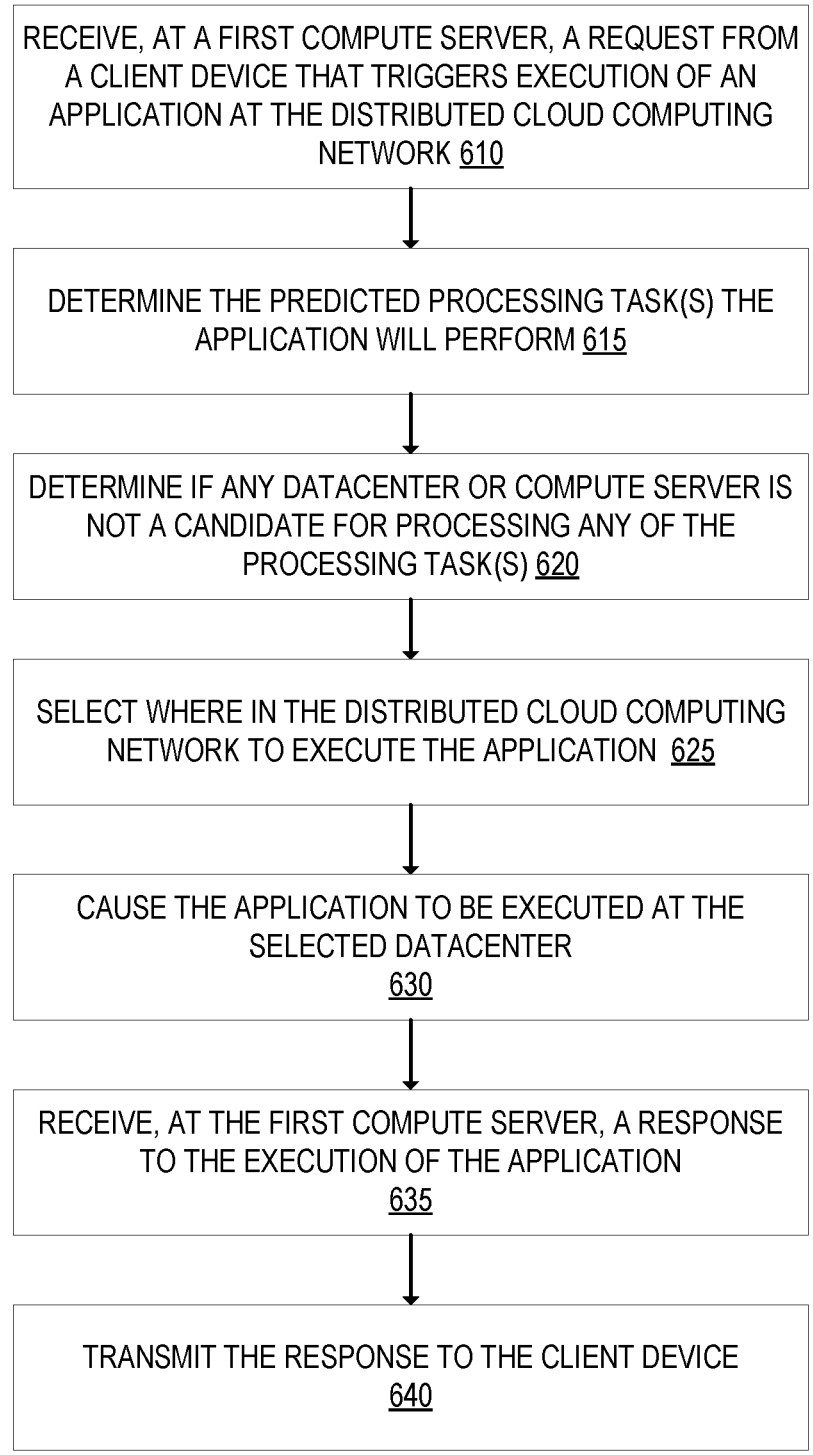
FIG. 6 is a flow diagram that illustrates exemplary operations for dynamically selecting where to run application code in a distributed cloud computing network according to an embodiment.

FIG. 6 is a flow diagram that illustrates exemplary operations for dynamically selecting where to run application code in a distributed cloud computing network according to an embodiment. The operations of FIG. 6 are described with respect to the exemplary embodiments of FIGS. 1 and 4. However, the exemplary embodiments of FIGS. 1 and 4 can perform operations different from that of FIG. 6, and the operations of FIG. 6 can be performed by different embodiments from that of FIGS. 1 and 4.

At operation 610, a first compute server 128A receives a request from a client device 110 that triggers execution of the application 115 at the distributed cloud computing network. The compute server that receives this request is sometimes referred herein as the initial compute server and the datacenter the initial compute server is part of is sometimes referred herein as the initial datacenter. The initial datacenter may be the datacenter that is closest to the requesting client device.

Next, at operation 615, the initial compute server 128A determines the predicted processing task(s) that the application will perform. For instance, the processing task predictor 415 can predict the number and destination of application calls that will be performed by the application. Predicting the processing may further include determining which of the predicted application call(s) must be performed serially and which of the predicted application call(s) can be performed in parallel. Predicting the processing may include determining the processing capability that is best suited for processing the predicted processing task(s) (e.g., determining whether a processing task is better suited for processing by a GPU versus a CPU). Predicting the processing tasks may be based on past behavior of requests that triggered the application, based on configuration from the application developer, and/or based on application code configurations.

As an example for predicting tasks based on past behavior, a machine learning model can be used to predict the number and destination of application calls that the application will perform. The machine learning model may take as input one or more properties of the initiating request such as the HTTP method, HTTP header(s), URL path, URL query parameters, and/or the HTTP body. Any or all of these can be signals that a different set of application calls can be made. The output of the machine learning model is the number of non-overlapping application calls (serial application calls) made to each destination. There may be a separate ML model trained for each unique application. In an embodiment, the same ML model for the application may be used at each of the compute servers of the distributed cloud computing network. That is, the same ML model is used network wide. In another embodiment, different ML models for the application can be used at a different granularity (e.g., per-datacenter, per-region level).

Determining which of the predicted application call(s) must be performed serially may be done by historical analysis of timestamps of the application calls that are performed by the application. A sequence of application calls with non-overlapping timestamps are treated as being serial and application calls with overlapping timestamps are treated as being parallel.

In an embodiment, predicting the processing the application will perform is based at least in part based on a configuration from the application developer. The configuration may specify, for instance, a list of hostnames and/or IP addresses for application calls the application will perform. The configuration may also include a weighting (how many application calls) to each unique hostname and/or IP address. The configuration may also indicate whether an application call is expected to be multi-homed. The configuration may include the preferred processing capability for the application. As an example, the configuration may specify that the preferred processing capability is to process the application with a GPU versus a CPU or that it is memory intensive. As another example, the configuration may specify properties of the application (e.g., video processing, processing large amounts of data in memory) that is then used to determine the processing capability that is suited to process the application. The configuration may be input to a central location and stored in a data structure available to the compute server (e.g., locally stored at each compute server or at each datacenter).

Operation 615 may not be performed if the optimization goal does not depend on the number and destination of the application calls such as if the optimization goal is based on minimizing processing cost (e.g., cost of CPU/hr) or based on compute resource availability.

There may be datacenters or compute servers that are not permitted, via policy, to perform the processing tasks of the application. For instance, a policy may be defined by the customer that specifies a geographic location of allowed processing and/or a geographic location of unallowed processing. The policy may be defined based on the source of the request and/or the destination of the request. For example, there may be a policy that for a request that originates from Europe, that the request be only processed at a server located in Europe. At operation 620, which is optional in an embodiment, the initial compute server 128A determines if any datacenter or compute server should not be a candidate for processing any of the application call(s) performed by the application. Any datacenter or compute server that is not allowed is removed from consideration.

Next, at operation 625, the compute server 128A dynamically selects where to execute the application 115 in the distributed cloud computing network 112 (e.g., select the particular datacenter 120 in the distributed cloud computing network to execute the application). For example, the selector 420 uses the set of metrics and/or attributes 430 and an optimization goal to select the datacenter to execute the application 115. The set of metrics may include a set of one or more link metrics (e.g., from each candidate datacenter to each target destination of the application call(s)) and/or a set of compute server metrics. The set of link metrics can indicate the latency, monetary expense, throughput, bandwidth, and reliability of the links. The latency from a particular datacenter to a particular destination (e.g., IP address or hostname) can be computed using network probes. The network probe data may include probe data for datacenter-to-datacenter links and/or probe data for datacenter-to-destination links. The probe data for datacenter-to-datacenter links and the probe data for datacenter-to-destination links may determine (at a particular time) for each link, the network average round trip time (RTT), the network minimum RTT, the network maximum RTT, the network median RTT, the network standard deviation, jitter metrics on network RTT, packet loss rate, throughput, IP path MTU, AS path (including number of ASes in the path and which specific ASes are in the path), packet reordering, and/or packet duplication. The compute server metrics may indicate the compute resource availability, current processing cost (e.g., cost of CPU/hr). The set of attributes may include attributes of the datacenter or compute server such as location, country, legal jurisdiction, region, datacenter tier type, server/datacenter certification (e.g., ISO-certified, FedRAMP), server generation, server manufacturer, and/or processing capability (e.g., hardware configuration such as, CPU, GPU, hardware accelerator(s), co-processor(s), storage device type/size, memory type/size).

In an embodiment, the selection of where in the distributed cloud computing network to execute the application can be done at the application level. In such an embodiment, the application is executed at a single one of the datacenters of the distributed cloud computing network. In another embodiment, the processing of the application can be split into multiple parts (e.g., a grouping of functions or each function) and a selection is made for each part regarding where to execute that part. In such an embodiment and as an example, a part of the application can be selected for execution at one datacenter (e.g., closer to the requesting client device) and another part of the application can be selected for execution at another datacenter (e.g., closer to a remote database). As another example, each application call of an application can be selected to be executed closest to the destination of that application call. The customer may configure the application to be split into multiple parts and may also include an optimization goal for each different part.

In an embodiment, the selection of where to execute includes determining a list of the top N datacenters (where N is greater than 1 and typically less than 5) for processing the function(s) of the application. This list can be used for redundancy (e.g., if the first one fails or is rejected a next one can be chosen). Further, this list can be used for load balancing so a single datacenter is not overloaded. The load balancing may include selecting one of these N datacenters randomly, or using a round-robin scheme between the N datacenters.

Figure 7:
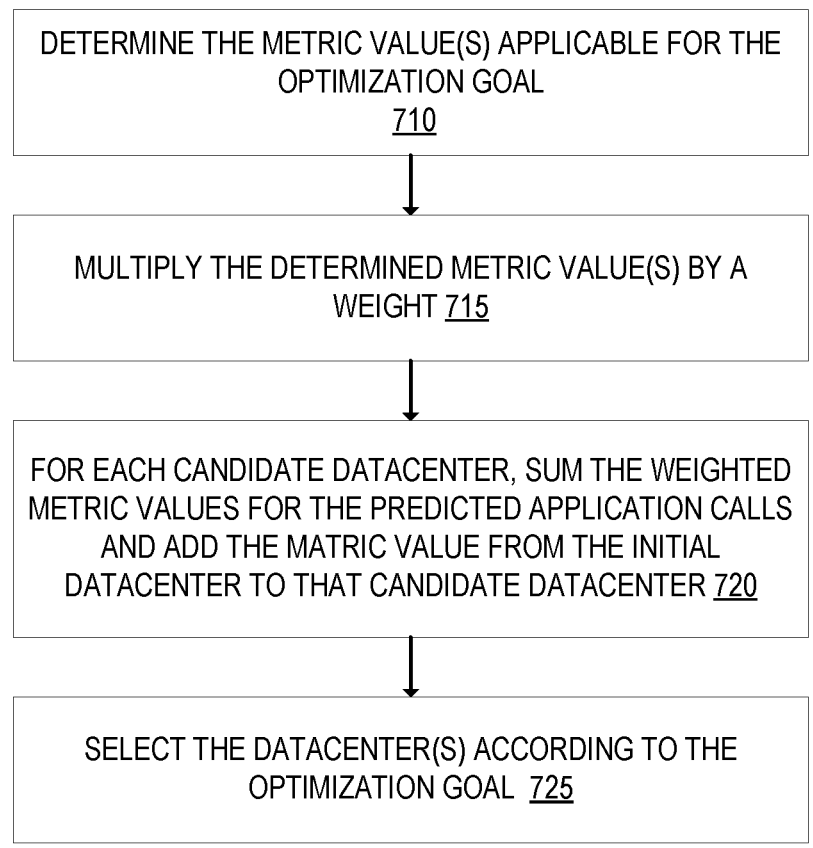
FIG. 7 is a flow diagram that illustrates exemplary operations for determining where in the distributed cloud computing network to execute an application based on an optimization goal according to an embodiment.

FIG. 7 is a flow diagram that illustrates exemplary operations for determining where in the distributed cloud computing network to execute an application based on an optimization goal according to an embodiment. The operations of FIG. 7 can be performed during operation 625 of FIG. 6. As an example throughout FIG. 7, the application includes five predicted application calls to a first IP address (e.g., an IP address of a database server in London) and two predicted application calls to a second IP address (e.g., an IP address of an API server in Texas).

At operation 710, the initial compute server determines the metric value(s) that are applicable for the optimization goal. For instance, if the optimization goal is based on network information (e.g., latency, link expense, throughput, bandwidth, and/or reliability), the initial compute server determines for each unique destination of the predicted application calls of the application (e.g., the IP address or hostname), the metric from each candidate datacenter to that destination. For instance, if the optimization goal is minimizing latency, the compute server determines for each unique destination of the predicted application calls of the application (e.g., the IP address or hostname), the latency from each datacenter to that destination. For instance, the compute server determines the latency from each datacenter in the distributed cloud computing network to the first IP address (e.g., the IP address of the database server in London) and the latency from each datacenter in the distributed cloud computing network to the second IP address (e.g., the IP address of the API server in Texas). As another example, if the optimization goal is minimizing expense, the compute server determines for each unique destination of the predicted application calls of the application (e.g., the IP address or hostname), the link expense from each datacenter to that destination. As another example, if the optimization goal is based on datacenter or compute server information (e.g., compute resource availability, current processing cost (e.g., cost of CPU/hr), and/or processing capability), the compute server determines the appropriate metric for each datacenter. For example, if the optimization goal is minimizing server expense, the compute server determines the current processing cost (e.g., cost of CPU/hr) of compute servers in each datacenter. The compute server may lookup the metric(s) using a data structure that is accessible to the compute server (e.g., stored locally or at another server within the datacenter). Datacenters that are not candidates for selection (e.g., due to geographical constraints) are not considered in this operation. In an embodiment, performing the metric lookup(s) for different datacenters can be done in parallel.

Next, at operation 715, the compute server multiplies the determined metric value(s) by a weight defined as the number of serial application calls that are to be performed. For instance, if the optimization goal is minimizing latency, the compute server multiplies the latency metric for each destination by the destination's weight, which is defined as the number of application calls that are predicted to be performed to that destination. For instance, the determined latency from each datacenter to the first IP address is multiplied by five and the determined latency from each datacenter to the second IP address is multiplied by two. The operation 715 may not be performed if the optimization goal is not based on link metric information (e.g., if the optimization goal is based on compute resource availability, current processing cost (e.g., cost of CPU/hr), and/or processing capability).

Next, at operation 720, for each datacenter, the compute server sums the weighted metric values for the predicted application calls and adds the metric value from the initial datacenter to that datacenter. For example, for each datacenter, the compute server sums the weighted latency metrics to the first IP address and the weighed latency metrics to the second IP address, and adds the latency metric from the current datacenter to that remote datacenter. If the current datacenter is evaluating itself, there is no additional latency metric from the current datacenter to a remote datacenter. The operation 720 may not be performed if the optimization goal is not based on link metric information (e.g., if the optimization goal is based on compute resource availability, current processing cost (e.g., cost of CPU/hr), and/or processing capability).

Next, at operation 725, the compute server selects the datacenter(s) according to the optimization goal. If the optimization goal is minimizing latency, the compute server selects the datacenter(s) that have the lowest predicted latency. The compute server may choose a list of the top N datacenters where N can be between 2-5. It is possible that multiple datacenters have the same metric score (e.g., the same latency). In such a case, the compute server can select any of the datacenters (e.g., randomly, round-robin) or perform another selection criteria (e.g., lowest cost, most resource availability).

In an embodiment, the operations of FIG. 7 are performed within a certain time budget. In such an embodiment, the compute server may prioritize determining the metric value(s) for the unique destinations based on the highest weight (e.g., the number of application calls to that unique destination). For instance, the compute server may start with the destination that has the most application calls, then the destination with the next most application calls, and so on, while the time budget remains.

Returning back to FIG. 6, the compute server 128A causes the application to be executed at the selected datacenter(s) at operation 630. For example, the router 425 can transmit the request to the selected datacenter. The selected datacenter processes the request that triggers the execution of the application including making the application calls. A response to the execution of the application is received at the compute server 128A at operation 635. The compute server 128A transmits the response to the client device 110 at operation 640.

Although FIG. 6 illustrates an example where the triggering event is receipt of a request, the application can be triggered by a different trigger event such as a predefined scheduled time, an alarm condition being met, an external event such as a receipt of an email, text message, or other electronic communication, and a message being sent to a queue system. In some cases, for example when the triggering event is an internal event such as a predefined scheduled time or an alarm condition being met, predicting the processing task(s) such as in operation 615 may not be performed because the processing task(s) may be known by the distributed cloud computing network. A list of processing task(s) and their properties (e.g., a list of hostnames and/or IP addresses for application calls the application will perform, a weighting of each unique hostname, whether done serially or in parallel) may be stored in association with the application. In such a case, the initial compute server (e.g., the initial compute server 128A) determines the processing task(s) that the application will perform.

Figure 8:
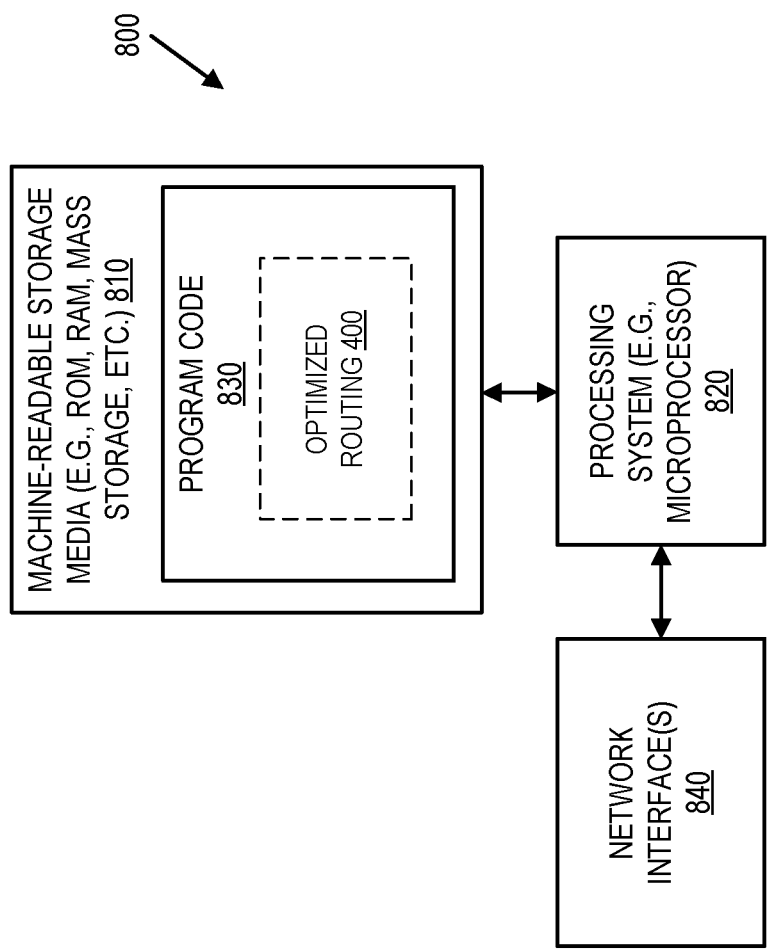
FIG. 8 illustrates a block diagram for an exemplary data processing system that may be used in some embodiments.

FIG. 8 illustrates a block diagram for an exemplary data processing system 800 that may be used in some embodiments. One or more such data processing systems 800 may be utilized to implement the embodiments and operations described with respect to the compute servers. The data processing system 800 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 810 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 820. For example, the depicted machine-readable storage media 810 may store program code 830 that, when executed by the processor(s) 820, causes the data processing system 800 to execute the optimized routing 400 and/or any of the operations described herein. The data processing system 800 also includes one or more network interfaces 840 (e.g., a wired and/or wireless interfaces) that allows the data processing system 800 to transmit data and receive data from other computing devices, typically across one or more networks (e.g., Local Area Networks (LANs), the Internet, etc.). Additional components, not shown, may also be part of the system 800, and, in certain embodiments, fewer components than that shown. One or more buses may be used to interconnect the various components shown in FIG. 8.

The techniques shown in the figures can be implemented using code and data stored and executed on one or more electronic devices (e.g., a client device, a compute server, a control server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

In the preceding description, numerous specific details are set forth to provide a more thorough understanding. However, embodiments may be practiced without such specific details. In other instances, full software instruction sequences have not been shown in detail to not obscure understanding. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
receiving a request from a client device at a first datacenter of a plurality of datacenters of a distributed cloud computing network;

determining that the received request triggers execution of code at the distributed cloud computing network;
determining that the code includes a first function and a second function;
determining to execute the first function at the first datacenter and to execute the second function at a second datacenter of the distributed cloud computing network;
executing the first function of the code at the first datacenter to get a first result;
causing the second function of the code to be executed at the second datacenter;
receiving, at the first datacenter, a second result from the execution of the second function of the code at the second datacenter; and
transmitting a response to the client device that is based at least in part on the first result and the second result.

2. The method of claim 1, wherein the code is third-party code that is written or deployed by a customer of the distributed cloud computing network.

3. The method of claim 1, wherein the determining to execute the first function at the first datacenter and to execute the second function at the second datacenter is based on an optimization goal for minimizing latency to the client device, wherein executing the first function at the first datacenter and executing the second function at the second datacenter results in a lowest total latency for responding to the client device.

4. The method of claim 1, wherein determining that the code includes the first function and the second function includes accessing configuration received from a customer of the distributed cloud computing network that specifies parts of the code.

5. The method of claim 1, wherein determining that the code includes the first function and the second function includes using a machine learning model that takes as input one or more parameters of the request and outputs a prediction of the first function and the second function.

6. The method of claim 5, wherein the machine learning model predicts whether the first function and the second function include serial application calls.

7. The method of claim 1, wherein the determining to execute the first function at the first datacenter and to execute the second function at the second datacenter is based on an optimization goal to minimize expense and current processing costs at each of the datacenters.

8. A non-transitory machine-readable storage medium that provides instructions that, if executed by a processor, will cause said processor to perform operations comprising:
receiving a request from a client device at a first datacenter of a plurality of datacenters of a distributed cloud computing network;
determining that the received request triggers execution of code at the distributed cloud computing network;
determining that the code includes a first function and a second function;
determining to execute the first function at the first datacenter and to execute the second function at a second datacenter of the distributed cloud computing network;
executing the first function of the code at the first datacenter to get a first result;
causing the second function of the code to be executed at the second datacenter;
receiving, at the first datacenter, a second result from the execution of the second function of the code at the second datacenter; and
transmitting a response to the client device that is based at least in part on the first result and the second result.

9. The non-transitory machine-readable storage medium of claim 8, wherein the code is third-party code that is written or deployed by a customer of the distributed cloud computing network.

10. The non-transitory machine-readable storage medium of claim 8, wherein the determining to execute the first function at the first datacenter and to execute the second function at the second datacenter is based on an optimization goal for minimizing latency to the client device, wherein executing the first function at the first datacenter and executing the second function at the second datacenter results in a lowest total latency for responding to the client device.

11. The non-transitory machine-readable storage medium of claim 8, wherein determining that the code includes the first function and the second function includes accessing configuration received from a customer of the distributed cloud computing network that specifies parts of the code.

12. The non-transitory machine-readable storage medium of claim 8, wherein determining that the code includes the first function and the second function includes using a machine learning model that takes as input one or more parameters of the request and outputs a prediction of the first function and the second function.

13. The non-transitory machine-readable storage medium of claim 12, wherein the machine learning model predicts whether the first function and the second function include serial application calls.

14. The non-transitory machine-readable storage medium of claim 8, wherein the determining to execute the first function at the first datacenter and to execute the second function at the second datacenter is based on an optimization goal to minimize expense and current processing costs at each of the datacenters.

15. A first compute server of a first datacenter of a plurality of datacenters of a distributed cloud computing network, the first compute server comprising:
a processor; and
a non-transitory machine-readable storage medium that provides instructions that, if executed by the processor, will cause the processor to perform operations comprising:
receiving a request from a client device;
determining that the received request triggers execution of code at the distributed cloud computing network;
determining that the code includes a first function and a second function;
determining to execute the first function at the first compute server of the first datacenter and to execute the second function at a second compute server of a second datacenter of the distributed cloud computing network;
executing the first function of the code at the first compute server of the first datacenter to get a first result;
causing the second function of the code to be executed at the second compute server of the second datacenter;
receiving, at the first compute server of the first datacenter, a second result from the execution of the second function of the code at the second compute server of the second datacenter; and
transmitting a response to the client device that is based at least in part on the first result and the second result.

16. The first compute server of claim 15, wherein the code is third-party code that is written or deployed by a customer of the distributed cloud computing network.

17. The first compute server of claim 15, wherein the determining to execute the first function at the first compute server of the first datacenter and to execute the second function at the second compute server of the second datacenter is based on an optimization goal for minimizing latency to the client device, wherein executing the first function at the first compute server of the first datacenter and executing the second function at the second compute server of the second datacenter results in a lowest total latency for responding to the client device.

18. The first compute server of claim 15, wherein determining that the code includes the first function and the second function includes accessing configuration received from a customer of the distributed cloud computing network that specifies parts of the code.

19. The first compute server of claim 15, wherein determining that the code includes the first function and the second function includes using a machine learning model that takes as input one or more parameters of the request and outputs a prediction of the first function and the second function.

20. The first compute server of claim 19, wherein the machine learning model predicts whether the first function and the second function include serial application calls.

21. The first compute server of claim 15, wherein the determining to execute the first function at the first compute server of the first datacenter and to execute the second function at the second compute server of the second datacenter is based on an optimization goal to minimize expense and current processing costs at each of the datacenters.

* * * * *